Figure 3:
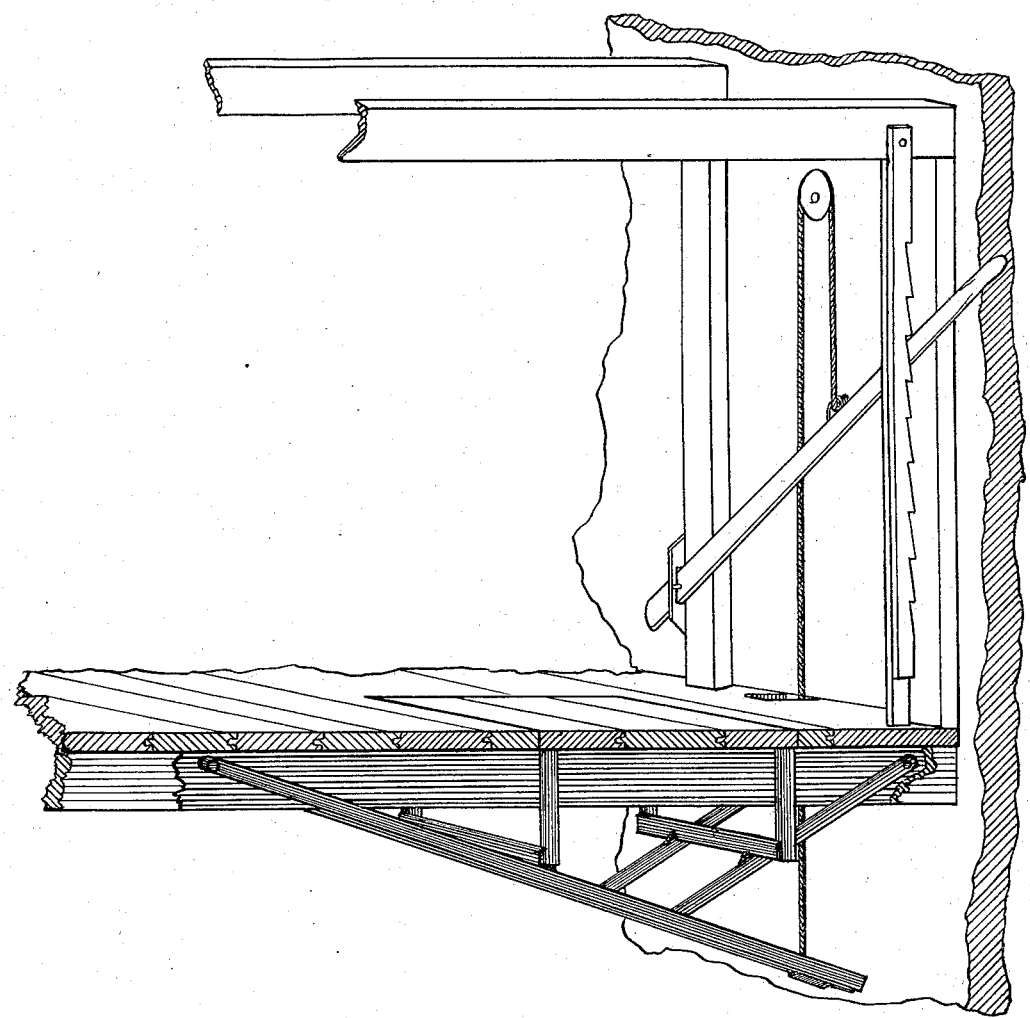

L. M. JOHNSON.
Sling for Shoeing Animals.
No. 163,378.
2 Sheets--Sheet 1.
Patented May 18, 1875.
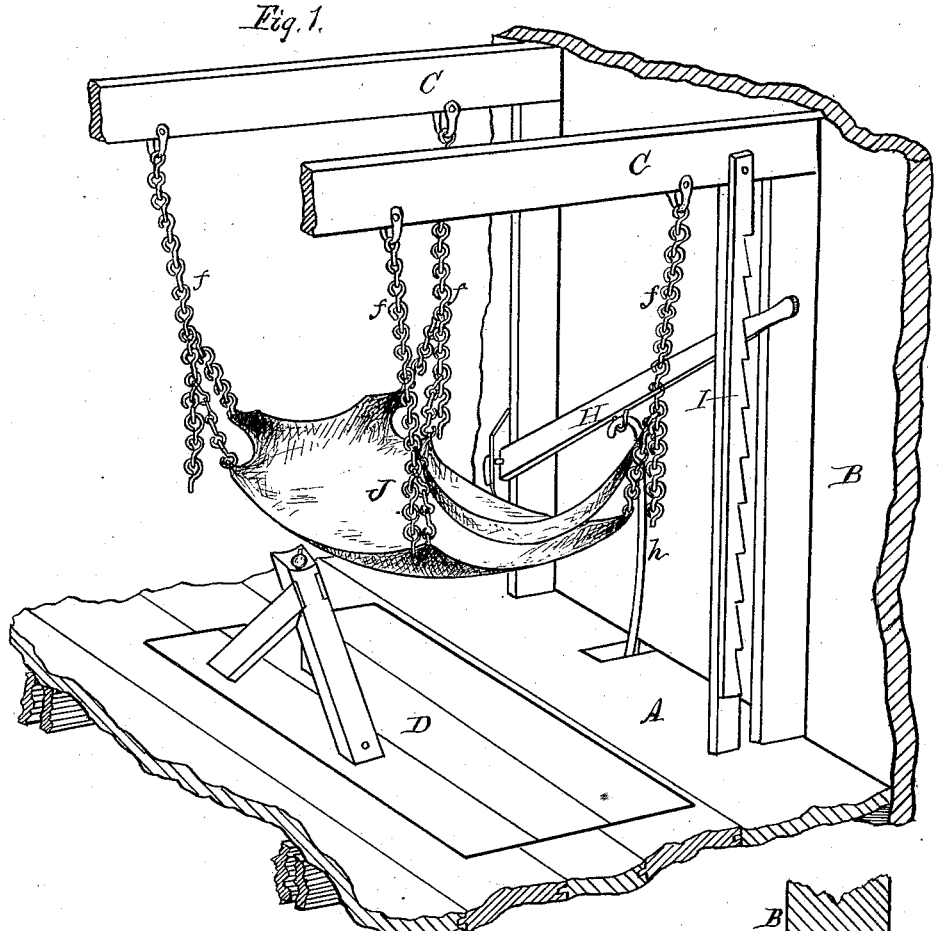
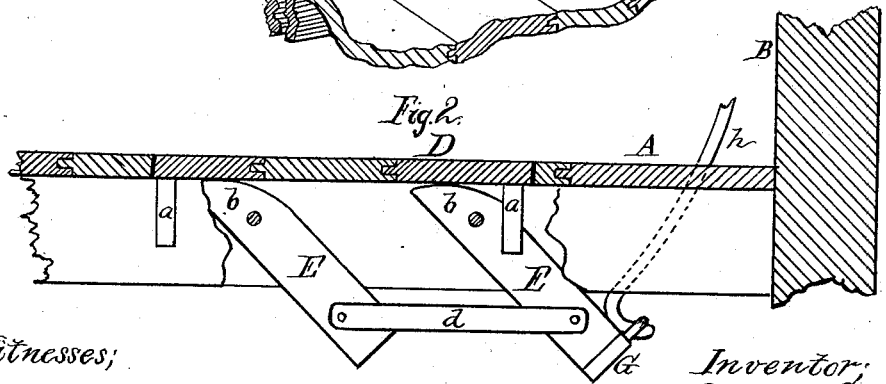
Witnesses:
Jas. T. Duhamel,
Thomas Byrne,
Inventor:
L. M. Johnson
H. S. Abbot
Att'y.

2 Sheets--Sheet 2.

L. M. JOHNSON.
Sling for Shoeing Animals.

No. 163,378. Patented May 18, 1875.

Witnesses:
Jas. T. Duhamel,
Thomas Byrne,

Inventor:
L. M. Johnson

UNITED STATES PATENT OFFICE.

LAFAYETTE M. JOHNSON, OF FOREST CITY, MISSOURI.

IMPROVEMENT IN SLINGS FOR SHOEING ANIMALS.

Specification forming part of Letters Patent No. 163,378, dated May 18, 1875; application filed March 9, 1875.

*To all whom it may concern:*

Be it known that I, LAFAYETTE M. JOHNSON, of Forest City, county of Holt and State of Missouri, have invented certain new and useful Improvements in Slings for Shoeing Horses and Oxen, of which the following is a specification:

The nature of my invention consists of a movable platform arranged in the floor of a blacksmith's shop or other place, and operated by cams or levers, or both, for the purpose of facilitating the suspension of horses or other animals when it is desired to shoe them, or for any other purpose it is desired to render them powerless, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view of my invention. Fig. 2 shows the arrangement of cams and levers under the floor. Fig. 3 shows a modification.

A represents the floor of a blacksmith-shop, and B one of the side walls. C C are two of the joists. In the floor A is made an opening of suitable size to receive a movable section or platform, D, which is at the corners, on the under side, provided with short posts $a\,a$ to act as guides for the platform in its up and down movement. Under the floor A, in the joists supporting the same, are pivoted two levers, E E, under each end of the platform. The upper ends of the levers form cams $b\,b$ to operate against the platform, and their lower ends are connected by a cross-bar, $d$, as shown. The lower ends of the two levers nearest the wall B are connected by a bar, G, and from the center of this bar a rod, $h$, extends up through the floor, and connects with a lever, H. One end of this lever is loosely pivoted to a post alongside the wall B, while the other end projects between two posts, and is held at any point by a swinging ratchet-bar, I.

By depressing the lever H the cam-levers E E are operated in such a manner as to raise the platform D to any required height above the floor, where it is held by the ratchet-bar I on the lever H. By swinging the ratchet-bar away from the lever the platform may be lowered again. In connection with this platform I use an apron or harness, J, suspended by means of ropes or chains $f$ from the joists C C. The horse or other animal to be suspended is led onto the platform D, which is then raised above the floor, as above described. The apron or harness J is then placed in proper position on the animal, and attached to the pendants $f$, after which the platform is lowered again, leaving the animal suspended for shoeing or any other purpose when required to render the animal powerless.

Having thus fully described my invention, what I claim as new, and desire to secure by Letters Patent, is—

1. In a shoeing apparatus, the platform D for raising the animal while securing the suspending devices, substantially as described.

2. The combination of the movable section or platform D, cam-levers E E, connecting-bar G, rod $h$, lever H, and swinging ratchet-bar I, all constructed substantially as and for the purposes herein set forth.

In testimony that I claim the foregoing as my invention I hereunto affix my signature.

L. M. JOHNSON.

Witnesses:
JOHN M. CANON,
JOHN FRANCE.